US012794909B2

(12) United States Patent
Adachi et al.

(10) Patent No.: US 12,794,909 B2
(45) Date of Patent: Nov. 10, 2026

(54) INFORMATION SEARCH METHOD, INFORMATION SEARCH DEVICE, AND NON-TRANSITORY COMPUTER-READABLE RECORDING MEDIUM

(71) Applicant: Panasonic Intellectual Property Management Co., Ltd., Osaka (JP)

(72) Inventors: Takahiro Adachi, Hyogo (JP); Tomoyuki Haga, Nara (JP); Tatsumi Oba, Chiba (JP); Hiroyuki Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/227,900

(22) Filed: Jun. 4, 2025

(65) Prior Publication Data

US 2025/0300998 A1 Sep. 25, 2025

Related U.S. Application Data

(63) Continuation of application No. PCT/JP2023/032842, filed on Sep. 8, 2023.

(Continued)

(30) Foreign Application Priority Data

Apr. 17, 2023 (JP) ................................ 2023-066860

(51) Int. Cl.
*H04L 9/40* (2022.01)
*G06F 16/953* (2019.01)

(52) U.S. Cl.
CPC ........ *H04L 63/1416* (2013.01); *G06F 16/953* (2019.01)

(58) Field of Classification Search
None
See application file for complete search history.

(56) References Cited

U.S. PATENT DOCUMENTS 7,210,041 B1 * 4/2007 Gryaznov .............. G06F 21/56 713/188
10,972,484 B1 * 4/2021 Swackhamer ...... H04L 63/1416

(Continued)

OTHER PUBLICATIONS

International Search Report (ISR) from International Searching Authority (Japan Patent Office) in International Pat. Appl. No. PCT/JP2023/032842, dated Nov. 7, 2023, together with an English language translation.

(Continued)

*Primary Examiner* — Bradley W Holder
(74) *Attorney, Agent, or Firm* — Greenblum & Bernstein, P.L.C.

(57) ABSTRACT

An information search method includes: calculating, for each of one or more non-malware-type domain objects, a first level of relevance between the non-malware-type domain object and each of a plurality of fields (a first relevance level calculation process); calculating one or more relevant non-malware-type domain objects for each of one or more malware-type domain objects (a relevant domain object calculation process); calculating, for each of the one or more malware-type domain objects, a second level of relevance between the malware-type domain object and each of the plurality of fields (a second relevance level calculation process); and outputting the second level of the relevance of at least one malware-type domain objects to an external device.

7 Claims, 17 Drawing Sheets

Related U.S. Application Data

(60) Provisional application No. 63/432,161, filed on Dec. 13, 2022.

(56) References Cited

U.S. PATENT DOCUMENTS

| | | | | |
|---|---|---|---|---|
| 2010/0169972 | A1* | 7/2010 | Kuo ...................... | G06F 21/564<br>707/E17.001 |
| 2018/0063171 | A1* | 3/2018 | Yamada ................ | G06F 16/951 |

OTHER PUBLICATIONS

Rastogi et al., "MALOnt: An Ontology for Malware Threat Intelligence," Deployable Machine Learning for Security Defense: First International Workshop, MLHat 2020, San Diego, CA, USA, Aug. 24, 2020, pp. 28-44.

* cited by examiner

FIG. 4

| id | Field | | | | | | | | | |
|---|---|---|---|---|---|---|---|---|---|---|
| | Home | | Mobility | | Factory | | Infrastructure | | Building | |
| | First level of relevance | Increase or decrease | First level of relevance | Increase or decrease | First level of relevance | Increase or decrease | First level of relevance | Increase or decrease | First level of relevance | Increase or decrease |
| domain-name--3c10e93f-798e-5a26-a0c1 | 0.66 | +0.16 | 0 | - | 0.33 | -0.17 | 0 | - | 0 | - |
| report--e52b2fa3-2af0-5e53-ad38 | 0.2 | +0.2 | 0.8 | -0.2 | 0.2 | - | 0 | - | 0 | - |
| ... | ... | ... | ... | ... | ... | ... | ... | ... | ... | ... |

FIG. 5

| | | Search query |
|---|---|---|
| IoC information | IP address | 111.111.11.11 |
| | Domain name | test.com |
| | URL | https://example.com/test/collect.php |
| | File name | Logi.exe |
| | File hash value | AsDfGhJkL1··· |
| Field | | Mobility |

INFORMATION SEARCH METHOD, INFORMATION SEARCH DEVICE, AND NON-TRANSITORY COMPUTER-READABLE RECORDING MEDIUM

CROSS REFERENCE TO RELATED APPLICATIONS

This is a continuation application of PCT International Application No. PCT/JP2023/032842 filed on Sep. 8, 2023, designating the United States of America, which is based on and claims priority of U.S. Provisional Patent Application No. 63/432,161 filed on Dec. 13, 2022, and Japanese Patent Application No. 2023-066860 filed on Apr. 17, 2023. The entire disclosures of the above-identified applications, including the specifications, drawings and claims are incorporated herein by reference in their entirety.

FIELD

The present disclosure relates to an information search method and an information search device for searching a database for information regarding cyberattacks and to a non-transitory computer-readable recording medium for searching a database for information regarding cyberattacks.

BACKGROUND

Conventionally, using a database that stores a collection of cyber threat intelligence, security analysts from security operation centers have investigated malware, which poses a threat to the security, on the basis of indicator of compromise (IoC) information indicating a trace of a cyberattack.

CITATION LIST

Non Patent Literature

NPL 1: Rastogi, N., Dutta, S., Zaki, M. J., Gittens, A., & Aggarwal, C. (2020). Malont: An ontology for malware threat intelligence. In Deployable Machine Learning for Security Defense: First International Workshop, MLHat 2020, San Diego, CA, USA, Aug. 24, 2020, Proceedings 1 (pp. 28-44). Springer International Publishing.

SUMMARY

Technical Problem

If the security analysts know which field (for example, housing, mobile bodies, factories, or infrastructure) and what extent malware to be investigated is relevant to, the security analysts can implement effective measures against said malware.

In view of this, an object of the present disclosure is to provide an information search method, etc., by which the level of relevance of malware registered in a database to each field can be output.

Solution to Problem

An information search method according to one aspect of the present disclosure is an information search method for searching a database including a plurality of domain objects and a plurality of relationship objects for information regarding a cyberattack, in which each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, and the label information is information indicating at least one of a plurality of fields. The information search method includes: calculating, for each of one or more non-malware-type domain objects including the type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects; calculating, for each of one or more malware-type domain objects including the type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects; calculating, for each of the one or more malware-type domain objects, a second level of relevance between the malware-type domain object and each of the plurality of fields, based on the first level of the relevance of each of the one or more relevant non-malware-type domain objects calculated in the calculating of the one or more relevant non-malware-type domain objects; and outputting, to an external device, the second level of the relevance of at least one of the one or more malware-type domain objects calculated in the calculating of the second level of the relevance.

An information search device according to one aspect of the present disclosure is an information search device that searches a database including a plurality of domain objects and a plurality of relationship objects for information regarding a cyberattack, in which each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, and the label information is information indicating at least one of a plurality of fields. The information search device includes: a first relevance level calculator that calculates, for each of one or more non-malware-type domain objects including the type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects; a relevant domain object calculator that calculates, for each of one or more malware-type domain objects including the type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects; a second relevance level calculator that calculates, for each of the one or more malware-type domain objects, a second level of relevance between the malware-type domain object and each of the plurality of fields, based on the first level of the relevance of each of the one or more relevant non-malware-type domain objects calculated by the relevant domain object calculator; and an outputter that outputs, to an external device, the second level of the relevance of at least one of the one or more malware-type domain objects calculated by the second relevance level calculator.

A non-transitory computer-readable recording medium according to one aspect of the present disclosure is a non-transitory computer-readable recording medium having recorded thereon a program for causing a computer to execute a process of searching a database including a plurality of domain objects and a plurality of relationship objects for information regarding a cyberattack, in which each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, and the label information is information indicating at least one of a plurality of fields. The process includes: calculating, for each of one or more non-malware-type domain objects including the type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects; calculating, for each of one or more malware-type domain objects including the type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects; calculating, for each of the one or more malware-type domain objects, a second level of relevance between the malware-type domain object and each of the plurality of fields, based on the first level of the relevance of each of the one or more relevant non-malware-type domain objects calculated in the calculating of the one or more relevant non-malware-type domain objects; and outputting, to an external device, the second level of the relevance of at least one of the one or more malware-type domain objects calculated in the calculating of the second level of the relevance.

Advantageous Effects

By an information search method, etc., according to one aspect of the present disclosure, the level of relevance of malware registered in a database to each field can be output.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a schematic diagram illustrating one example of a field table according to Embodiment 1.

FIG. 5 is a schematic diagram illustrating one example of a situation where a security analyst enters a search query.

Figure 1:
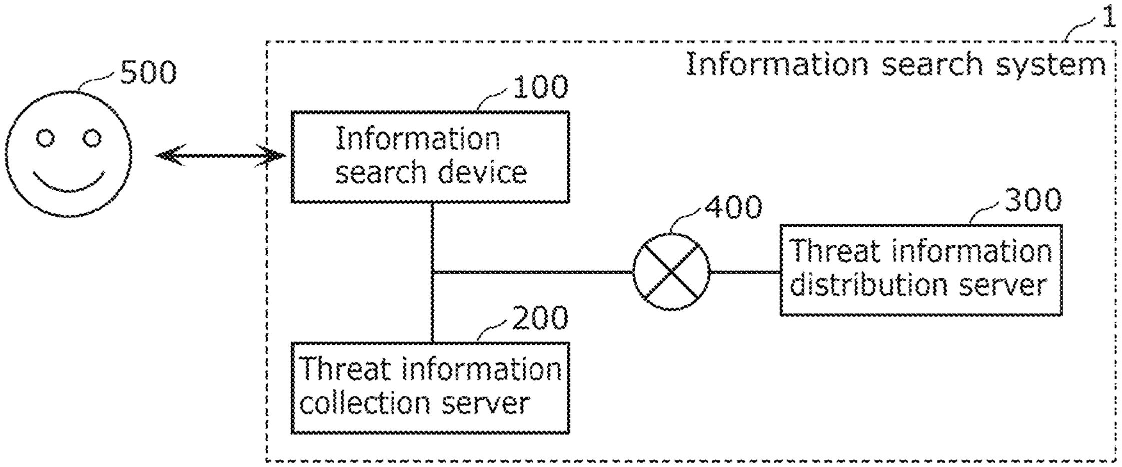
FIG. 1 is a block diagram illustrating the configuration of an information search system according to Embodiment 1.

DESCRIPTION OF EMBODIMENTS (Circumstances Leading to the Present Disclosure)

When a system assigned to a security analyst is hit by a malware-based cyberattack, the security analyst collects information regarding said malware and implements measures against said malware on the basis of the information collected.

However, for example, in cases where vulnerability that malware to be addressed aims to exploit exists in systems belonging to various fields, there is a risk that if the security analyst implements measures against said malware for only systems belonging to a specific field relevant to the system assigned to the security analyst, the measures may be insufficient to address said malware.

To deal with this, the inventors conceived the idea that when the security analyst knows which field and what extent the malware is relevant to before implementing measures against the malware, the security analyst can implement effective measures against the malware.

Thus, on the basis of this idea, the inventors repeated diligent experiments and examinations on an information search method, etc., that makes it possible to gain knowledge of which field and what extent the malware to be investigated is relevant to.

As a result, the inventors conceived of an information search method, an information search device, and a non-transitory computer-readable recording medium according to the present disclosure described below.

An information search method according to one aspect of the present disclosure is an information search method for searching a database including a plurality of domain objects and a plurality of relationship objects for information regarding a cyberattack, in which each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, and the label information is information indicating at least one of a plurality of fields. The information search method includes: calculating, for each of one or more non-malware-type domain objects including the type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects; calculating, for each of one or more malware-type domain objects including the type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects; calculating, for each of the one or more malware-type domain objects, a second level of relevance between the malware-type domain object and each of the plurality of fields, based on the first level of the relevance of each of the one or more relevant non-malware-type domain objects calculated in the calculating of the one or more relevant non-malware-type domain objects; and outputting, to an external device, the second level of the relevance of at least one of the one or more malware-type domain objects calculated in the calculating of the second level of the relevance.

According to this information search method, the second relevance level indicating the level of relevance of the malware registered in the database to each field is output.

Therefore, a security analyst who uses this information search method can refer to the second relevance level of the malware to be investigated and thus gain knowledge of which field and what extent said malware is relevant to.

Furthermore, the plurality of fields may include at least two fields selected from among a home field indicating a field relevant to housing, a mobility field indicating a field relevant to a mobile body, a factory field indicating a field relevant to a factory, an infrastructure field indicating a field relevant to infrastructure, and a building field indicating a field relevant to a building.

Thus, the second relevance level is output that indicates the level of relevance of the malware registered in the database to each of at least two fields among the housing field, the mobile body field, the factory field, and the infrastructure field.

Therefore, a security analyst who uses this information search method can gain knowledge of which field and what extent the malware to be investigated is relevant to in at least two fields among the housing field, the mobile body field, the factory field, and the infrastructure field.

Furthermore, each of the plurality of domain objects may further include name information indicating a name of the domain object and linked to the type information included in the domain object. The information search method may further include: obtaining one or more search queries; and calculating, for each of the one or more malware-type domain objects, a matching name count that is a total number of one or more names that match the one or more search queries among one or more names indicated in one or more items of the name information included in one or more domain objects linked to the malware-type domain object according to one or more items of the link information included in one or more relationship objects among the plurality of relationship objects. In the outputting, the one or more malware-type domain objects may be reordered in descending order of the matching name count, and the second level of the relevance may be output based on a result of the reordering.

Thus, malware samples can be arranged in descending order of relevance to the search query, and the second relevance level indicating the level of relevance of each malware to each field can be output.

Therefore, a security analyst who uses this information search method can gain knowledge of which field and what extent each malware is relevant to in the state where the malware samples are arranged in descending order of relevance to the search query.

Furthermore, each of the plurality of domain objects may further include name information indicating a name of the domain object and linked to the type information included in the domain object. The information search method may further include: obtaining one or more search queries; and calculating, for each of the one or more malware-type domain objects, a minimum value of a normalized Levenshtein distance between each of the one or more search queries and each of one or more names indicated in one or more items of the name information included in one or more domain objects linked to the malware-type domain object according to one or more items of the link information included in one or more relationship objects among the plurality of relationship objects, and calculating an average distance that is an average of minimum values of the normalized Levenshtein distance calculated for the one or more names. In the outputting, the one or more malware-type domain objects may be reordered in ascending order of the average distance, and the second level of the relevance may be output based on a result of the reordering.

Thus, malware samples can be arranged in descending order of relevance to the search query, and the second relevance level indicating the level of relevance of each malware to each field can be output.

Therefore, a security analyst who uses this information search method can gain knowledge of which field and what extent each malware is relevant to in the state where the malware samples are arranged in descending order of relevance to the search query.

Furthermore, in the calculating of the second level of the relevance, an average of first levels of the relevance calculated for the one or more relevant non-malware-type domain objects may be calculated as the second level of the relevance.

Thus, the second relevance level can be calculated through a relatively simple calculation process.

An information search device according to one aspect of the present disclosure is an information search device that searches a database including a plurality of domain objects and a plurality of relationship objects for information regarding a cyberattack, in which each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, and the label information is information indicating at least one of a plurality of fields. The information search device includes: a first relevance level calculator that calculates, for each of one or more non-malware-type domain objects including the type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects; a relevant domain object calculator that calculates, for each of one or more malware-type domain objects including the type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects; a second relevance level calculator that calculates, for each of the one or more malware-type domain objects, a second level of relevance between the malware-type domain object and each of the plurality of fields, based on the first level of the relevance of each of the one or more relevant non-malware-type domain objects calculated by the relevant domain object calculator; and an outputter that outputs, to an external device, the second level of the relevance of at least one of the one or more malware-type domain objects calculated by the second relevance level calculator.

With this information search device, the second relevance level indicating the level of relevance of the malware registered in the database to each field is output.

Therefore, a security analyst who uses this information search device can refer to the second relevance level of the malware to be investigated and thus gain knowledge of which field and what extent said malware is relevant to.

A non-transitory computer-readable recording medium according to one aspect of the present disclosure is a non-transitory computer-readable recording medium for causing a computer to execute a process of searching a database including a plurality of domain objects and a plurality of relationship objects for information regarding a cyberattack, in which each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, and the label information is information indicating at least one of a plurality of fields. The process includes: calculating, for each of one or more non-malware-type domain objects including the type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects; calculating, for each of one or more malware-type domain objects including the type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects; calculating, for each of the one or more malware-type domain objects, a second level of relevance between the malware-type domain object and each of the plurality of fields, based on the first level of the relevance of each of the one or more relevant non-malware-type domain objects calculated in the calculating of the one or more relevant non-malware-type domain objects; and outputting, to an external device, the second level of the relevance of at least one of the one or more malware-type domain objects calculated in the calculating of the second level of the relevance.

With this non-transitory computer-readable recording medium, the second relevance level indicating the level of relevance of the malware registered in the database to each field is output.

Therefore, a security analyst who uses this non-transitory computer-readable recording medium can refer to the second relevance level of the malware to be investigated and thus gain knowledge of which field and what extent said malware is relevant to.

Hereinafter, a specific example of an information search device according to one aspect of the present disclosure will be described with reference to the drawings. Each embodiment described below shows a specific example of the present disclosure. Thus, the numerical values, shapes, structural elements, and the arrangement and connection of the structural elements, steps, the processing order of the steps etc., shown in the following embodiments are mere examples, and are not intended to limit the present disclosure. Note that the figures are schematic diagrams and are not necessarily precise illustrations. In the respective figures, substantially identical elements are assigned the same reference signs, and overlapping description is omitted or simplified.

Embodiment 1

<Configuration>

FIG. 1 is a block diagram illustrating the configuration of information search system 1 according to Embodiment 1.

As illustrated in FIG. 1, information search system 1 includes information search device 100, threat information collection server 200, threat information distribution server 300, and network 400.

Threat information distribution server 300, which is connected to network 400, distributes threat information to an external device connected to network 400.

The threat information is a database in which information regarding cyberattacks is accumulated. The following description assumes that the threat information is a database in the structured threat information expression (STIX) format as a not necessarily limiting example.

Figure 2:
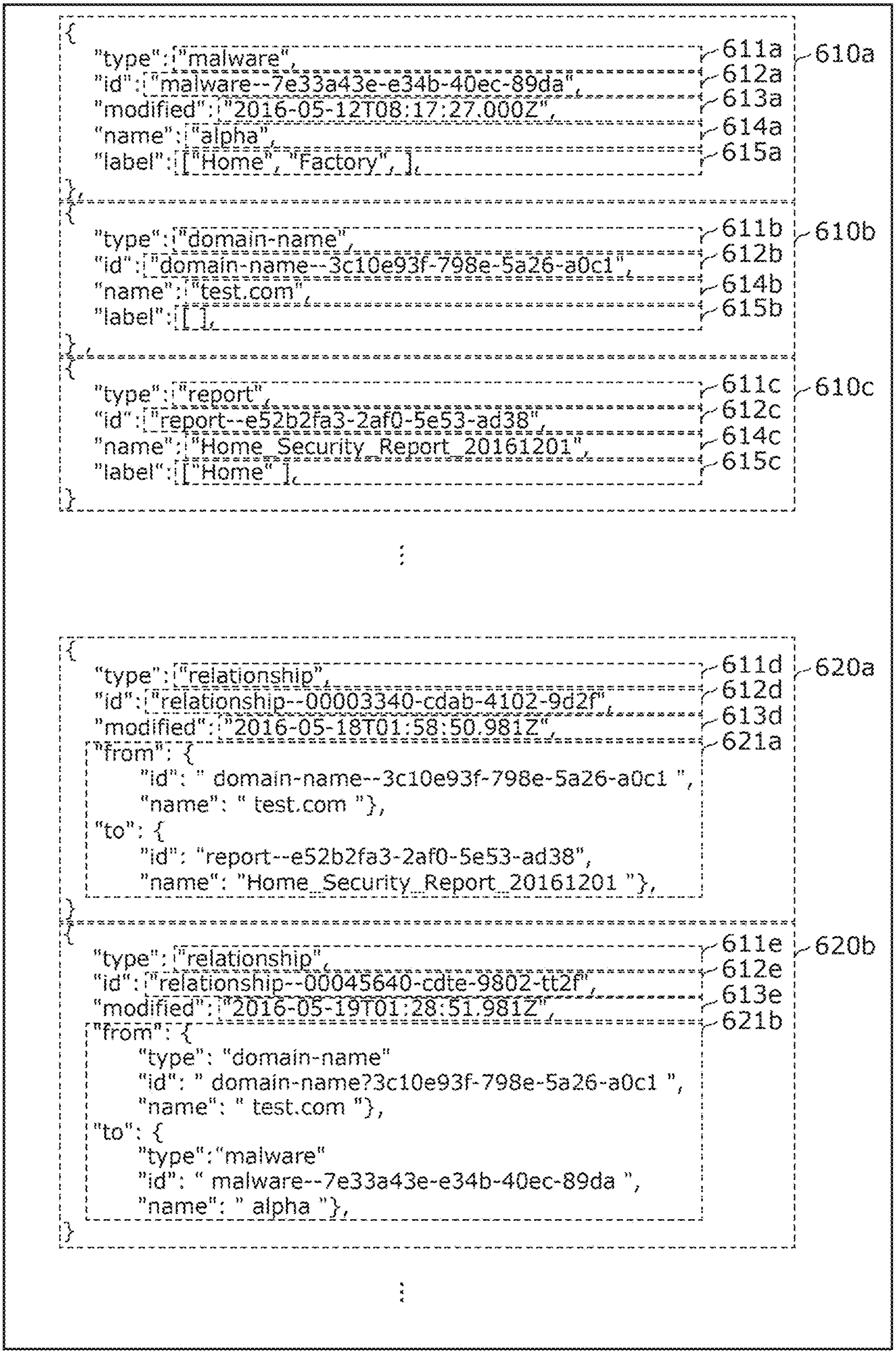
FIG. 2 is a schematic diagram illustrating the data structure of threat information according to Embodiment 1.

FIG. 2 is a schematic diagram illustrating the data structure of the threat information distributed by threat information distribution server 300.

As illustrated in FIG. 2, the threat information includes a plurality of domain objects 610 (that are domain object 610*a*, domain object 610*b*, and domain object 610*c* in FIG. 2) and a plurality of relationship objects 620 (that are relationship object 620*a* and relationship object 620*b* in FIG. 2).

As illustrated in FIG. 2, domain object 610 includes type information 611 (that is type information 611*a*, type information 611*b*, type information 611*c*, type information 611*d*, and type information 611*e* in FIG. 2), identification information 612 (that is identification information 612*a*, identification information 612*b*, identification information 612*c*, identification information 612*d*, and identification information 612*e* in FIG. 2), update information 613 (that is update information 613*a*, update information 613*d*, and update information 613*e* in FIG. 2), name information 614 (that is name information 614*a*, name information 614*b*, and name information 614*c* in FIG. 2), and label information 615 (that is label information 615*a*, label information 615*b*, and label information 615*c* in FIG. 2), which are linked together.

Type information 611 is information indicating one of two or more types including a type representing malware. The following description assumes that the two or more types include a type representing a domain name, a type representing a report, and a type representing a relationship as types other than the type representing malware as a not necessarily limiting example.

Among these two or more types, one of the type representing malware, the type representing a domain name, and the type representing a report is included in domain object 610, and the type representing a relationship is included in relationship object 620. Specifically, an object including one of the type representing malware, the type representing a domain name, and the type representing a report is domain object 610, and an object including the type representing a relationship is relationship object 620.

Identification information 612 is information indicating an identifier that identifies domain object 610 or relationship object 620.

Update information 613 is information indicating the date and time of the last update of domain object 610 or relationship object 620. The following description assumes that domain object 610 and relationship object 620 that have never been updated do not include update information 613.

Name information 614 is information indicating the name of domain object 610 or relationship object 620.

The name indicated in name information 614 includes, for example, the name of malware, the name of an IP address relevant to a cyberattack, the name of a domain relevant to the cyberattack, the name of a uniform resource locator (URL) relevant to the cyberattack, the file name of the malware, and the file hash value of the malware.

Label information 615 is information indicating a field to which domain object 610 is relevant. The following description assumes that the field indicated in label information 615 includes a home field indicating a field relevant to housing, a mobility field indicating a field relevant to mobile bodies, a factory field indicating a field relevant to factories, an infrastructure field indicating a field relevant to infrastructure, and a building field indicating a field relevant to buildings as a not necessarily limiting example.

When domain object 610 is relevant to two or more fields, domain object 610 may include label information 615 indicating each of the two or more fields.

Furthermore, when the field relevant to domain object 610 is unknown or when there is no field relevant to domain object 610, domain object 610 may include no label information 615.

As illustrated in FIG. 2, relationship object 620 includes type information 611, identification information 612, update information 613, and link information 621 (that is link information 621*a* and link information 621*b* in FIG. 2), which are linked together.

Link information 621 is information that links one domain object 610 and another domain object 610 together among the plurality of domain objects 610 included in the threat information.

Referring back to FIG. 1, information search system 1 will be further described.

Threat information collection server 200, which is connected to network 400 and information search device 100, obtains, via network 400, the threat information distributed from threat information distribution server 300, and stores the threat information.

Information search device 100, which is connected to threat information collection server 200 and network 400, searches the threat information stored in threat information collection server 200 for information regarding a cyberattack. Information search device 100 is a device to be used by security analyst 500, for example, when a system assigned to security analyst 500 is hit by a malware-based cyberattack, to collect information regarding said malware and implement measures against said malware on the basis of the information collected.

Information search device 100 is embodied using a computer device including a processor, memory, an input/output interface, and a communication interface and realized by the processor executing a program stored in the memory, for example.

Figure 3:
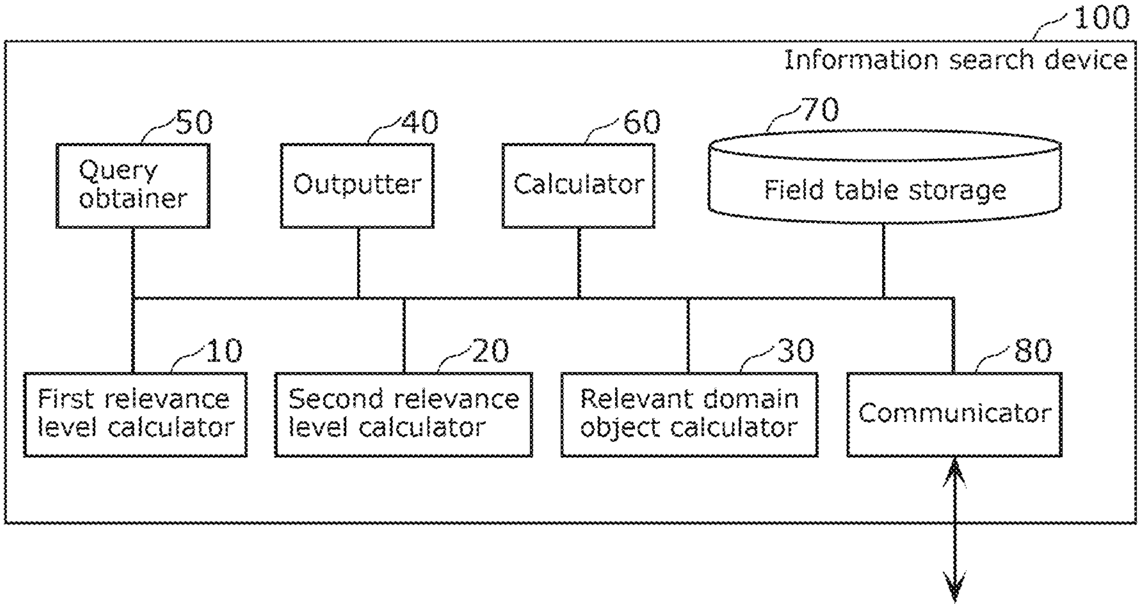
FIG. 3 is a block diagram illustrating the configuration of an information search device according to Embodiment 1.

FIG. 3 is a block diagram illustrating the configuration of information search device 100.

As illustrated in FIG. 3, information search device 100 includes first relevance level calculator 10, second relevance level calculator 20, relevant domain object calculator 30, outputter 40, query obtainer 50, calculator 60, field table storage 70, and communicator 80.

Communicator 80 communicates with an external device. The external device with which communicator 80 communicates includes threat information collection server 200.

First relevance level calculator 10 calculates, for each of one or more non-malware-type domain objects including type information 611 indicating a type other than malware among the plurality of domain objects 610 included in the threat information stored in threat information collection server 200, a first level of relevance between said non-malware-type domain object and each of a plurality of fields on the basis of one or more fields indicated in one or more items of label information 615 included in one or more domain objects linked to said non-malware-type domain object according to link information 621 included in one or more relationship objects 620 among the plurality of relationship objects 620 included in said threat information.

Embodiment 1 described herein assumes that first relevance level calculator 10 calculates said first level of relevance by performing a first relevance level calculation process.

Specific processing details of the first relevance level calculation process will be described later.

Furthermore, first relevance level calculator 10 generates a field table in which one or more non-malware-type domain objects and the first relevance levels calculated for said non-malware-type domain objects are associated.

FIG. 4 is a schematic diagram illustrating one example of the field table generated by first relevance level calculator 10.

As illustrated in FIG. 4, the field table is a table in which an identifier that identifies a non-malware-type domain object, the first level of relevance to each field, and the amount of increase or decrease in the first level of relevance to each field are associated. The amount of increase or decrease in the first level of relevance to each field is an increment or a decrement from the last first level of relevance calculated for each field by first relevance level calculator 10 to the new first level of relevance currently calculated for the field by first relevance level calculator 10.

The field table illustrated in FIG. 4 shows that, for example, regarding the non-malware-type domain object identified by the identifier "domain-name—3c10e93f-798e-5a26-a0c1," the first level of relevance thereof to the home field is 0.66, the amount of increase or decrease thereof is +0.11, the first level of relevance thereof to the mobility field is 0, the amount of increase or decrease thereof is absent, the first level of relevance thereof to the factory field is 0.33, the amount of increase or decrease thereof is −0.17, the first level of relevance thereof to the infrastructure field is 0, the amount of increase or decrease thereof is absent, the first level of relevance thereof to the building field is 0, and the amount of increase or decrease thereof is absent.

Referring back to FIG. 3, information search device 100 will be further described.

Field table storage 70 stores the field table generated by first relevance level calculator 10.

Relevant domain object calculator 30 calculates, for each of one or more malware-type domain objects including type information 611 indicating malware among the plurality of domain objects 610 included in the threat information stored in threat information collection server 200, one or more relevant non-malware-type domain objects including type information indicating a type other than malware that are linked to said malware-type domain object according to link information 621 included in one or more relationship objects 620 among the plurality of relationship objects 620 included in said threat information.

Embodiment 1 described herein assumes that relevant domain object calculator 30 calculates these one or more relevant non-malware-type domain objects by performing a relevant domain object calculation process.

Specific processing details of the relevant domain object calculation process will be described later.

Second relevance level calculator 20 calculates, for each of the one or more malware-type domain objects among the plurality of domain objects 610 included in the threat information stored in threat information collection server 200, a second level of relevance between said malware-type domain object and each of the plurality of fields on the basis of the first level of relevance of each of the one or more relevant non-malware-type domain objects calculated by relevant domain object calculator 30.

The description herein assumes that second relevance level calculator 20 calculates, as the second level of relevance between said malware-type domain object and each of the plurality of fields, the average of the first levels of relevance of the one or more relevant non-malware-type domain objects calculated by relevant domain object calculator 30.

Embodiment 1 described herein assumes that second relevance level calculator 20 calculates said second level of relevance by performing a second relevance level calculation process.

Specific processing details of the second relevance level calculation process will be described later.

Query obtainer 50 obtains one or more search queries.

The description herein assumes that as a not necessarily limiting example, query obtainer 50, which includes an input interface, obtains one or more search queries input by a user who uses information search device 100, for example, security analyst 500, via the input interface.

The search query is information to be used by security analyst 500, for example, when the system assigned to security analyst 500 is hit by a malware-based cyberattack, to collect information regarding said malware.

The search query is, for example, IoC information or the like that indicates a trace of the cyberattack remaining in the system hit by the malware-based cyberattack.

FIG. 5 is a schematic diagram illustrating one example of a situation where security analyst 500 enters a search query on the input interface included in query obtainer 50.

As illustrated in FIG. 5, query obtainer 50 obtains one or more search queries entered by security analyst 500 such as a suspicious IP address, a suspicious domain name, a suspicious URL, a suspicious executable file name, or a suspicious executable file hash value, which is the IoC information indicating a trace of the cyberattack, or information indicating a field relevant to the system hit by the cyberattack, for example.

The one or more search queries obtained by query obtainer 50 may include a name that matches a name indicated in name information 614, for example, the name of the malware, the name of the IP address relevant to the cyberattack, the name of the domain relevant to the cyberattack, the name of the URL relevant to the cyberattack, the file name of the malware, or the file hash value of the malware, for example.

Referring back to FIG. 3, information search device 100 will be further described.

Calculator 60 calculates, for each of the one or more malware-type domain objects included in the threat information stored in threat information collection server 200, a matching name count that is the number of one or more names that match the one or more search queries obtained by query obtainer 50 among the names indicated in one or more items of name information 614 included in the one or more domain objects linked to said malware-type domain object according to link information 621 included in one or more relationship objects 620 among the plurality of relationship objects 620 included in said threat information.

Outputter 40 outputs, to an external device, the second level of relevance calculated by second relevance level calculator 20 for at least one of the one or more malware-type domain objects included in the threat information stored in threat information collection server 200.

At this time, outputter 40 reorders the one or more malware-type domain objects in descending order of the matching name count calculated by calculator 60, and outputs the second level of relevance on the basis of the result of reordering.

The description herein assumes that as a not necessarily limiting example, outputter 40, which includes a display, generates an image representing the second level of relevance of at least one of the one or more malware-type domain objects included in the threat information stored in threat information collection server 200, and shows the generated image on the display, thus outputting said second level of relevance.

Figure 6:
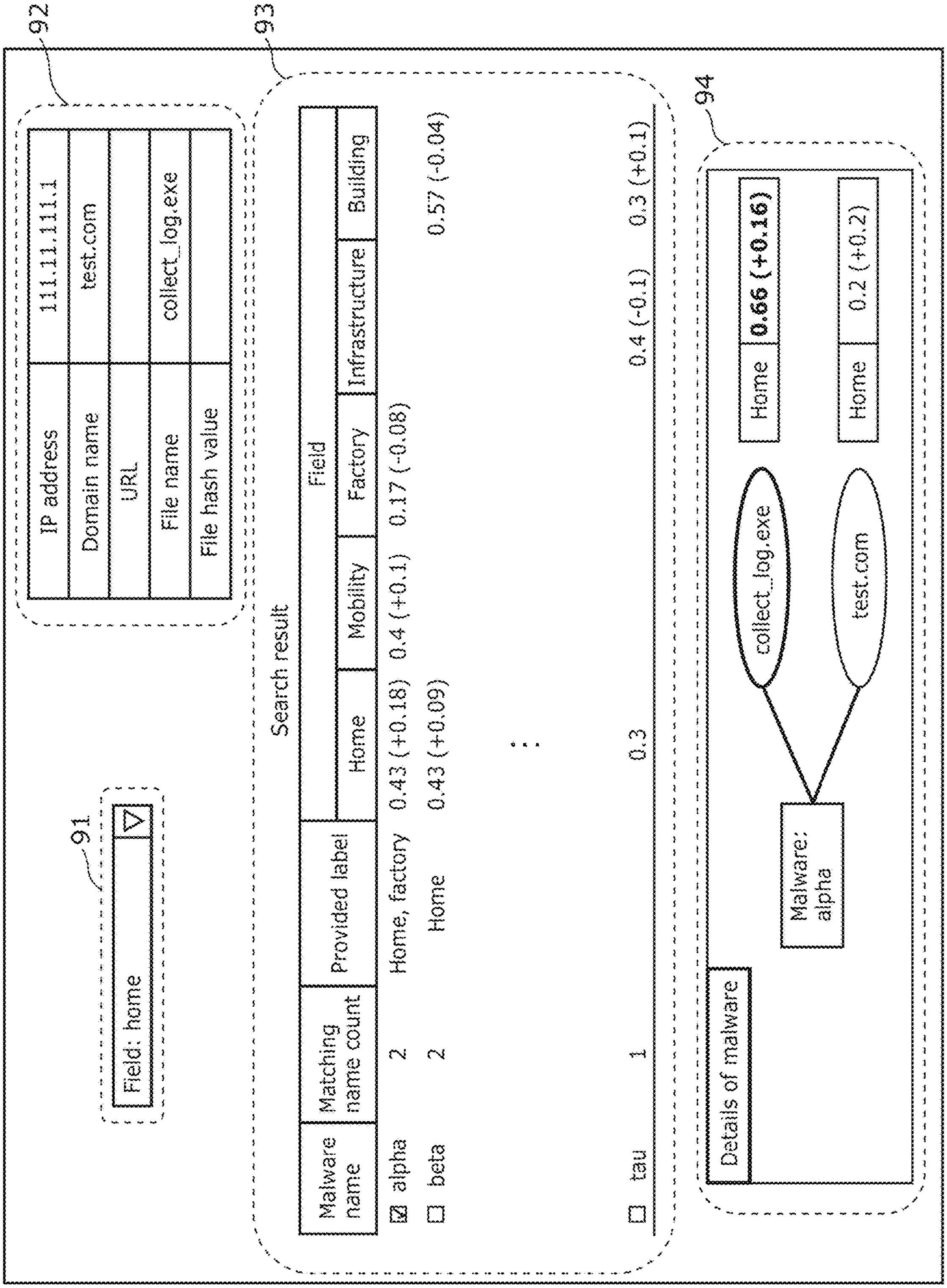
FIG. 6 is a schematic diagram illustrating one example of an image generated by an outputter according to Embodiment 1.

FIG. 6 is a schematic diagram illustrating one example of the image generated by outputter 40.

As illustrated in FIG. 6, the image output by outputter 40 includes field selection bar 91, search query list 92, search result display region 93, and details display region 94.

Field selection bar 91 is a selection bar that allows a user who uses information search device 100, for example, security analyst 500, to select one field from among the plurality of fields to be indicated in label information 615.

The options included in field selection bar 91 may further include the option to not select any of the fields. Search query list 92 is a list of the one or more search queries obtained by query obtainer 50, that is, a list of the one or more search queries entered by a user who uses information search device 100.

Search result display region 93 is a region in which the second levels of relevance between the one or more malware-type domain objects to be displayed and each of the plurality of fields are displayed in descending order of the matching name count from the top to the bottom.

The one or more malware-type domain objects to be displayed are malware-type domain objects each having the second level of relevance greater than 0 with respect to the field selected on field selection bar 91.

In each row in search result display region 93, for one malware-type domain object, (1) the malware name indicated in name information 614 included in the malware-type domain object, (2) the matching name count, (3) the field indicated in label information 615 included in the malware-type domain object, and (4) the second level of relevance to each of the plurality of fields and the amount of increase or decrease in the second level of relevance to said field are displayed in association with each other. The amount of increase or decrease in the second level of relevance is an increment or a decrement from the last second level of relevance calculated for each field by second relevance level calculator 20 to the new second level of relevance currently calculated for the field by second relevance level calculator 20.

Details display region 94 is a region that shows the relationship between each of the one or more search queries obtained by query obtainer 50 and one malware-type domain object selected by a user who uses information search device 100 from among the one or more malware-type domain objects shown in search result display region 93, that is, a malware-type domain object with a check in the box in the malware name in search result display region 93.

This example shows (1) that the malware-type domain object with the malware name "alpha" selected by the user is linked to the non-malware-type domain object with the file name "collect_log.exe" and the non-malware-type domain object with the domain name "test.com" according to one or more items of link information 621 included in one or more relationship objects 620, (2) that the first level of relevance of the non-malware-type domain object with the file name "collect_log.exe" to "the home field" is 0.66 and the amount of increase or decrease thereof is +0.16, and (3) that the first level of relevance of the non-malware-type domain object with the domain name "test.com" to "the home field" is 0.2 and the amount of increase or decrease thereof is +0.2.

Both the file name "collect_log.exe" and the domain name "test.com" are character strings included in the one or more search queries obtained by query obtainer 50.

<Operation>

The operation performed by information search system 1 configured as described above will be described below.

Information search system 1 performs an information search process in which the threat information serving as a database is searched for information regarding a cyberattack.

Figure 7:
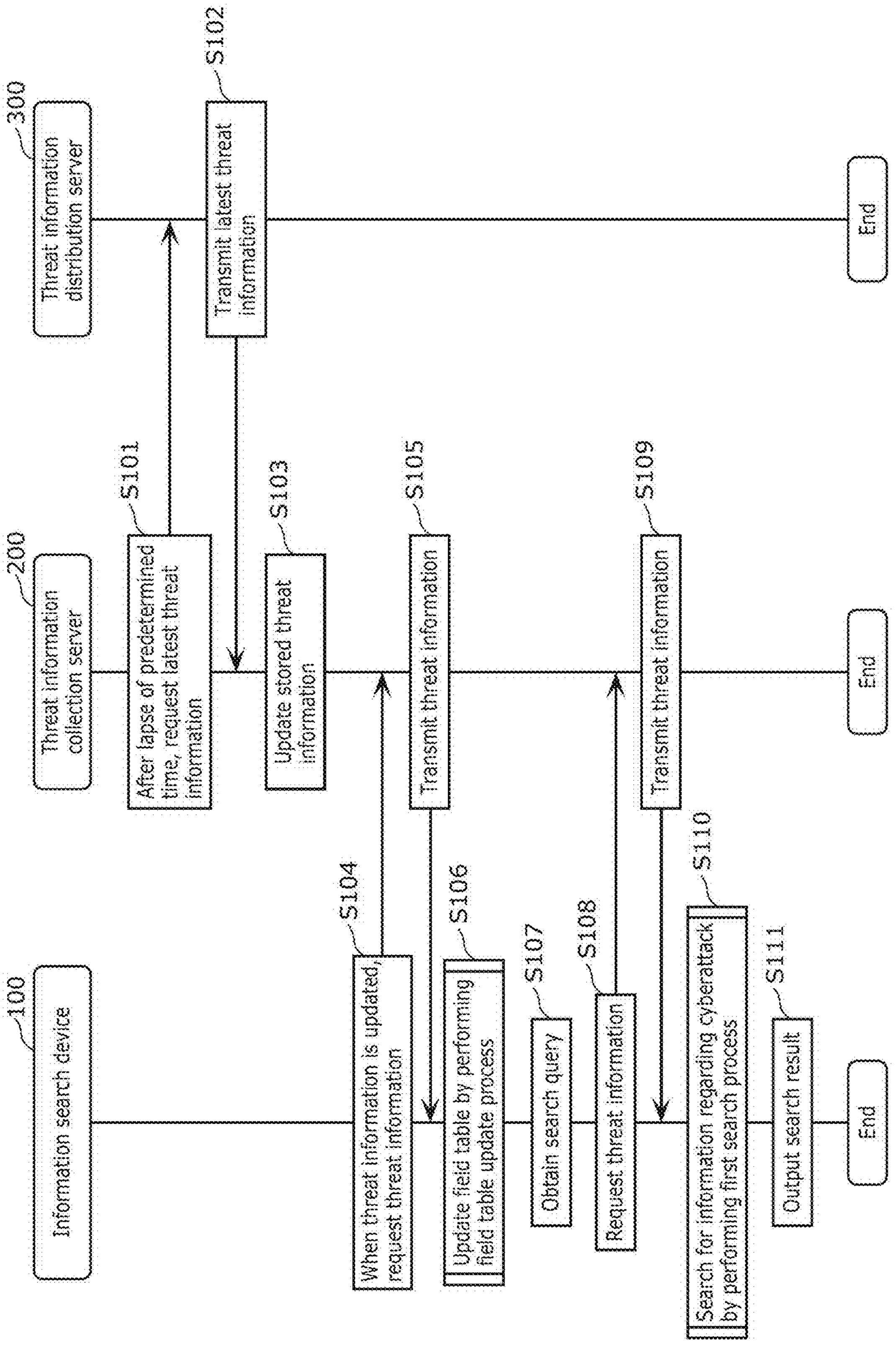
FIG. 7 is a sequence chart of an information search process performed by an information search system according to Embodiment 1.

FIG. 7 is a sequence chart of the information search process performed by information search system 1.

As indicated in FIG. 7, whenever a predetermined amount of time (for example, one day) elapses, threat information collection server 200 requests threat information distribution server 300 to provide the latest threat information; in other words, whenever the predetermined amount of time has elapsed since the last request for the threat information, threat information collection server 200 requests threat information distribution server 300 to provide the latest threat information (Step S101).

Thus, threat information distribution server 300 transmits the latest threat information to threat information collection server 200 (Step S102).

When the latest threat information is transmitted from threat information distribution server 300, threat information collection server 200 updates the stored threat information with said latest threat information (Step S103).

When threat information collection server 200 updates the threat information, information search device 100 requests threat information collection server 200 to provide the updated threat information (Step S104).

Thus, threat information collection server 200 transmits the updated threat information to information search device 100 (Step S105).

When the updated threat information is transmitted from threat information collection server 200, information search device 100 updates the field table by performing a field table update process using said threat information (Step S106).

When a user who uses information search device 100 enters one or more search queries, information search device 100 obtains the entered one or more search queries (Step S107).

Subsequently, information search device 100 requests threat information collection server 200 to provide the threat information (Step S108).

Thus, threat information collection server 200 transmits the stored threat information to information search device 100 (Step S109).

When the threat information is transmitted from threat information collection server 200, information search device 100 searches for information regarding a cyberattack by performing a first search process using said threat information, the search query obtained in the process in Step S107, and the field table updated in the process in Step S106 (Step S110).

Subsequently, information search device 100 outputs a search result (Step S111).

Figure 8:
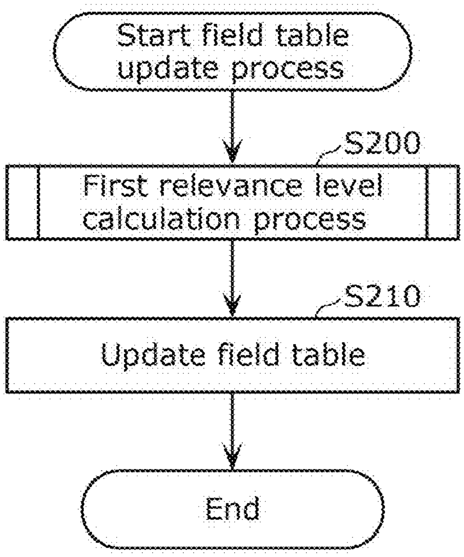
FIG. 8 is a flowchart of a field table update process performed by an information search device according to Embodiment 1.

FIG. 8 is a flowchart of the field table update process performed by information search device 100.

As indicated in FIG. 8, when the field table update process starts, first relevance level calculator 10 performs the first relevance level calculation process to calculate, for each of the one or more non-malware-type domain objects included in the threat information stored in threat information collection server 200, the first level of relevance between said non-malware-type domain object and each of the plurality of fields (Step S200).

Figure 9:
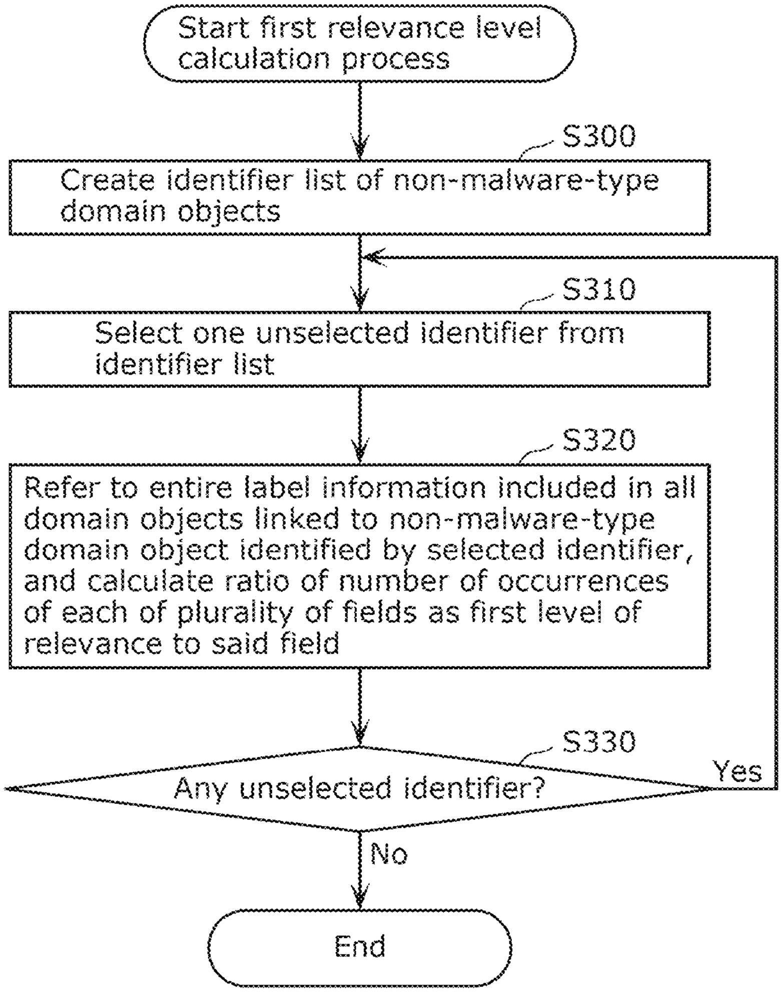
FIG. 9 is a flowchart of a first relevance level calculation process performed by a first relevance level calculator according to Embodiment 1.

FIG. 9 is a flowchart of the first relevance level calculation process performed by first relevance level calculator 10.

As indicated in FIG. 9, when the first relevance level calculation process starts, first relevance level calculator 10 creates an identifier list of the one or more non-malware-type domain objects included in the threat information stored in threat information collection server 200 (hereinafter also referred to as "the first identifier list") (Step S300).

When the first identifier list is created, first relevance level calculator 10 selects one unselected identifier from the first identifier list (Step S310). This unselected identifier refers to an identifier that is included in the first identifier list and has not yet been selected in the process in Step S310 in the loop process formed of the process in Step S310 to the process of Yes in Step S330 (which will be described later).

When the unselected identifier is selected, first relevance level calculator 10 refers to all the one or more items of label information included in all domain objects 610 linked to the non-malware-type domain object identified by the selected identifier, according to the link information included in one or more relationship objects 620 included in the threat information stored in threat information collection server 200, and calculates a ratio of the number of occurrences of each of the plurality of fields to the number of occurrences of all the fields as the first level of relevance between said non-malware-type domain object and said field (Step S320).

When the of first level relevance between the non-malware-type domain object and each of the plurality of fields is calculated, first relevance level calculator 10 checks whether there is an unselected identifier among the identifiers included in the first identifier list (Step S330).

When there is an unselected identifier in the process in Step S330 (Yes in Step S330), first relevance level calculator 10 performs the process in Step S310 again.

When there is no unselected identifier in the process in Step S330 (No in Step S330), first relevance level calculator 10 ends the first relevance level calculation process.

Referring back to FIG. 8, the field table update process will be further described.

When the first relevance level calculation process ends, in other words, when the process in Step S200 ends, first relevance level calculator 10 updates the field table stored in field table storage 70, on the basis of the first level of relevance between each of the one or more non-malware-type domain objects and each of the plurality of fields that has been calculated for said non-malware-type domain object (Step S210).

When the process in Step S210 ends, information search device 100 ends the field table update process.

Figure 10:
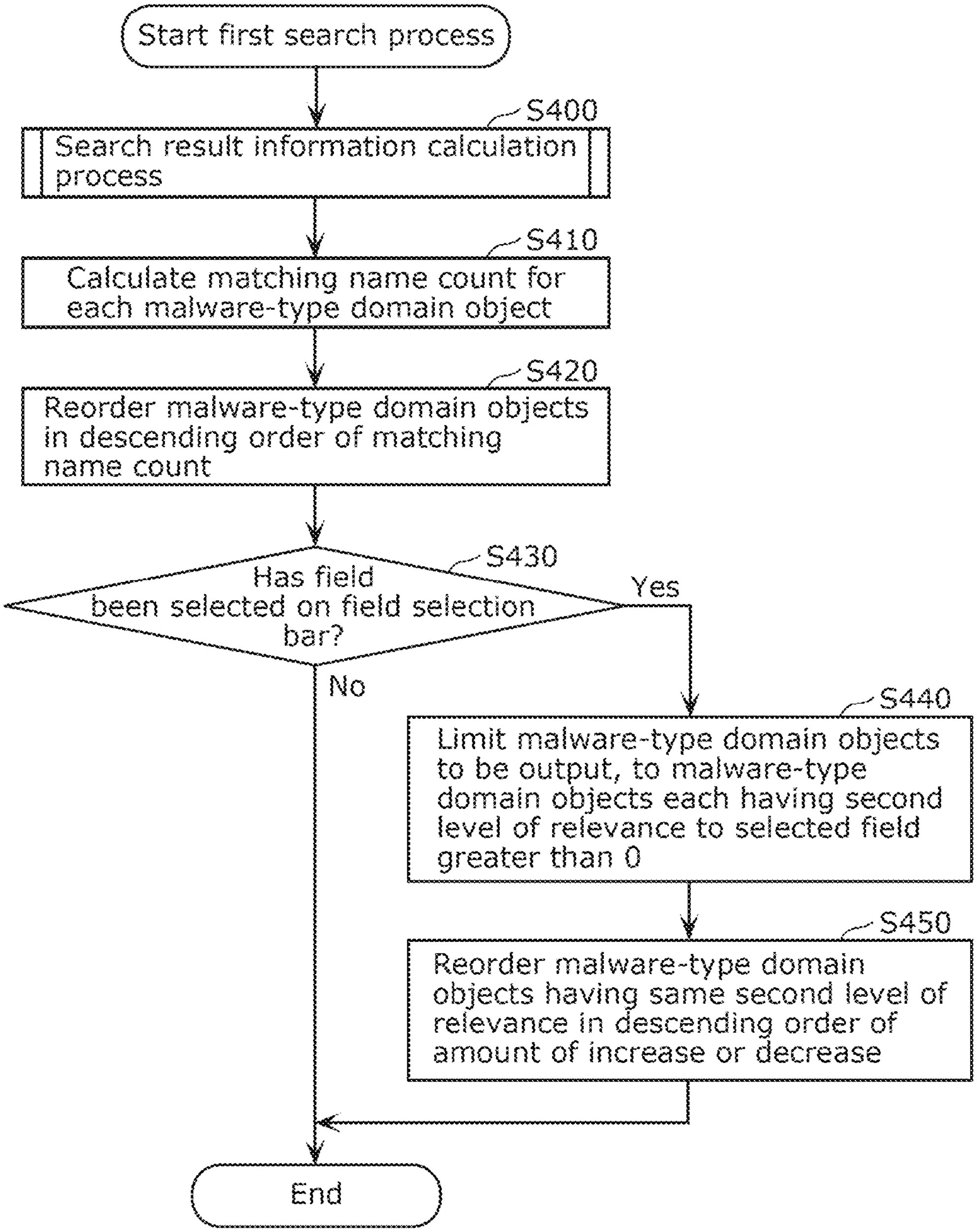
FIG. 10 is a flowchart of a first search process performed by an information search device according to Embodiment 1.

FIG. 10 is a flowchart of the first search process performed by information search device 100.

As indicated in FIG. 10, when the first search process starts, information search device 100 performs a search result information calculation process (Step S400).

Figure 11:
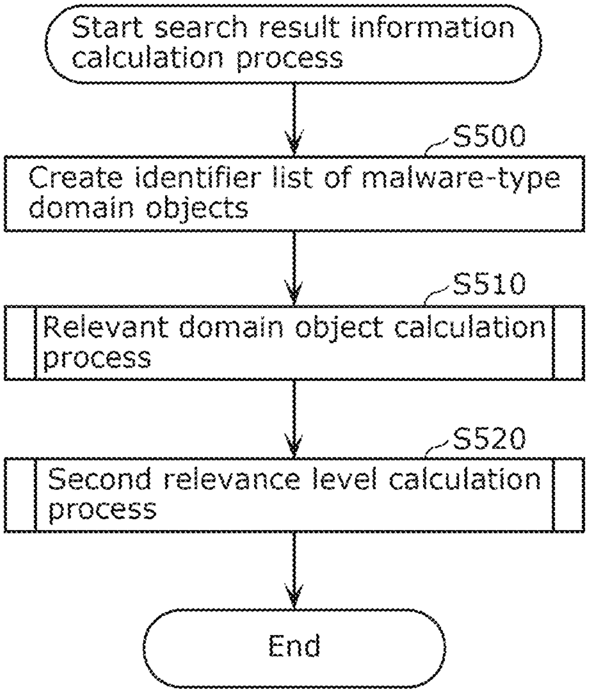
FIG. 11 is a flowchart of a search result information calculation process performed by an information search device according to Embodiment 1.

FIG. 11 is a flowchart of the search result information calculation process performed by information search device 100.

As indicated in FIG. 11, when the search result information calculation process starts, relevant domain object calculator 30 creates an identifier list of the one or more malware-type domain objects included in the threat information stored in threat information collection server 200 (hereinafter also referred to as "the second identifier list") (Step S500).

When the second identifier list is created, relevant domain object calculator 30 performs the relevant domain object calculation process (Step S510).

Figure 12:
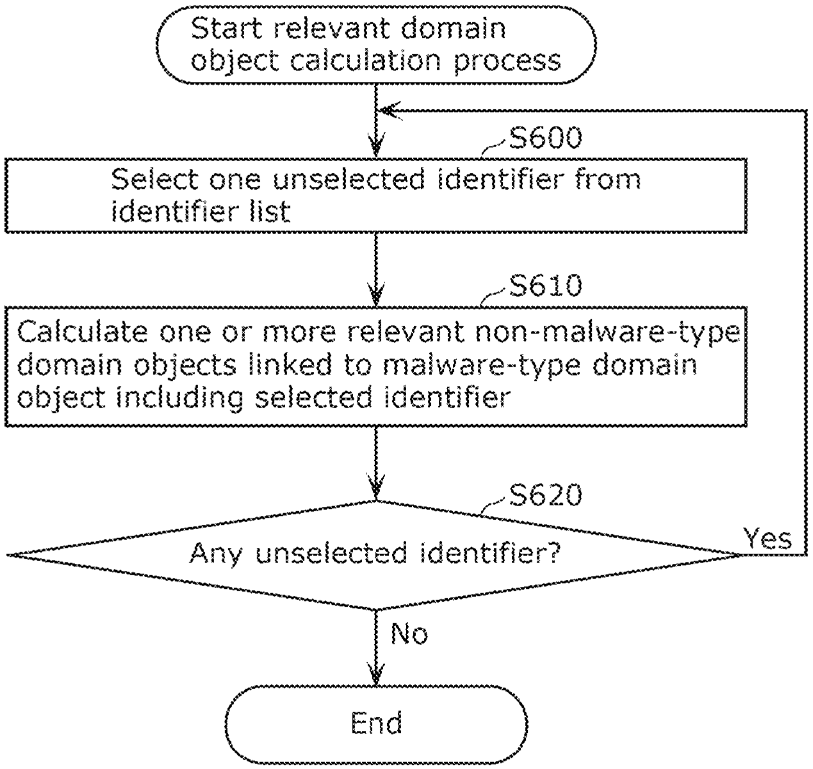
FIG. 12 is a flowchart of a relevant domain object calculation process performed by a relevant domain object calculator according to Embodiment 1.

FIG. 12 is a flowchart of the relevant domain object calculation process performed by relevant domain object calculator 30.

As indicated in FIG. 12, when the relevant domain object calculation process starts, relevant domain object calculator 30 selects one unselected identifier from the second identifier list (Step S600). This unselected identifier refers to an identifier that is included in the second identifier list and has not yet been selected in the process in Step S600 in the loop process formed of the process in Step S600 to the process of Yes in Step S620 (which will be described later).

When the unselected identifier is selected, relevant domain object calculator 30 calculates one or more relevant non-malware-type domain objects including type information indicating a type other than malware that are linked to the malware-type domain object identified by the selected identifier, according to link information 621 included in one or more relationship objects 620 included in the threat information stored in threat information collection server 200 (Step S620).

When the one or more relevant non-malware-type domain objects are calculated, relevant domain object calculator 30 checks whether there is an unselected identifier among the identifiers included in the second identifier list (Step S620).

When there is an unselected identifier in the process in Step S620 (Yes in Step S620), relevant domain object calculator 30 performs the process in Step S600 again.

When there is no unselected identifier in the process in Step S620 (No in Step S620), relevant domain object calculator 30 ends the relevant domain object calculation process.

Referring back to FIG. 11, the search result information calculation process will be further described.

When the relevant domain object calculation process ends, in other words, when the process in Step S510 ends, second relevance level calculator 20 performs the second relevance level calculation process (Step S520).

Figure 13:
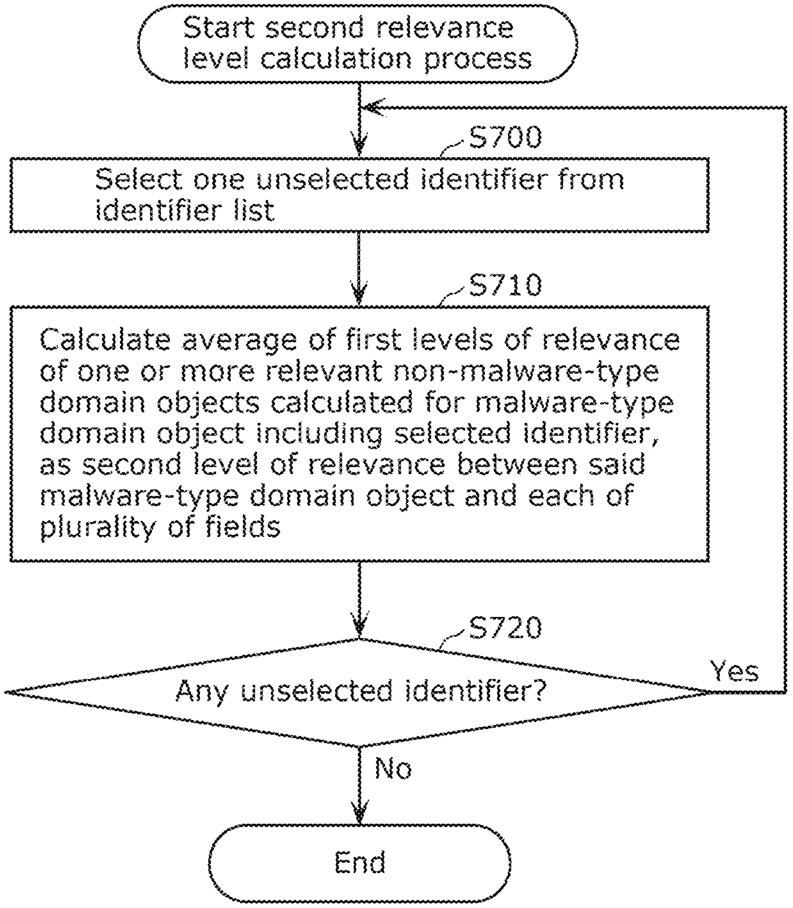
FIG. 13 is a flowchart of a second relevance level calculation process performed by a second relevance level calculator according to Embodiment 1.

FIG. 13 is a flowchart of the second relevance level calculation process performed by second relevance level calculator 20.

As indicated in FIG. 13, when the second relevance level calculation process starts, second relevance level calculator 20 selects one unselected identifier from the second identifier list (Step S700). This unselected identifier refers to an identifier that is included in the second identifier list and has not yet been selected in the process in Step S700 in the loop process formed of the process in Step S700 to the process of Yes in Step S720 (which will be described later).

When the unselected identifier is selected, second relevance level calculator 20 calculates the average of the first levels of relevance of the one or more relevant non-malware-type domain objects calculated by the search result information calculation process for the malware-type domain object including the selected identifier, as the second level of relevance between said malware-type domain object and each of the plurality of fields (Step S710).

When the second level of relevance between said malware-type domain object and each of the plurality of fields is calculated, second relevance level calculator 20 checks whether there is an unselected identifier among the identifiers included in the second identifier list (Step S720).

When there is an unselected identifier in the process in Step S720 (Yes in Step S720), second relevance level calculator 20 performs the process in Step S700 again.

When there is no unselected identifier in the process in Step S720 (No in Step S720), second relevance level calculator 20 ends the second relevance level calculation process. Referring back to FIG. 11, the search result information calculation process will be further described.

When the second relevance level calculation process ends, in other words, when the process in Step S520 ends, information search device 100 ends the search result information calculation process.

Referring back to FIG. 10, the first search process will be further described.

When the search result information calculation process ends, in other words, when the process in Step S400 ends, calculator 60 calculates a matching name count for each malware-type domain object (Step S410).

When the matching name count for each malware-type domain object is calculated, outputter 40 reorders the malware-type domain objects in descending order of the matching name count (Step S420).

When the malware-type domain objects are reordered in descending order of the matching name count, outputter 40 checks whether a field has been selected on field selection bar 91 (Step S430).

When a field has been selected on field selection bar 91 in the process in Step S430 (Yes in Step S430), outputter 40 limits the malware-type domain objects to be output, to malware-type domain objects each having the second level of relevance greater than 0 with respect to the selected field (Step S440).

When the malware-type domain objects to be output are limited and there are malware-type domain objects having the same second level of relevance to the selected field among the malware-type domain objects to be output, outputter 40 reorders these malware-type domain objects in descending order of the amount of increase or decrease (Step S450).

When no field has been selected on field selection bar 91 in the process in Step S430 (No in Step S430) and when the process in Step S450 ends, information search device 100 ends the first search process.

Embodiment 2

Hereinafter, an information search device according to Embodiment 2 will be described which is configured by changing part of the configuration of information search device 100 according to Embodiment 1.

The information search device according to Embodiment 2 performs a second search process instead of the first search process performed by information search device 100 according to Embodiment 1.

<Configuration>

Figure 14:
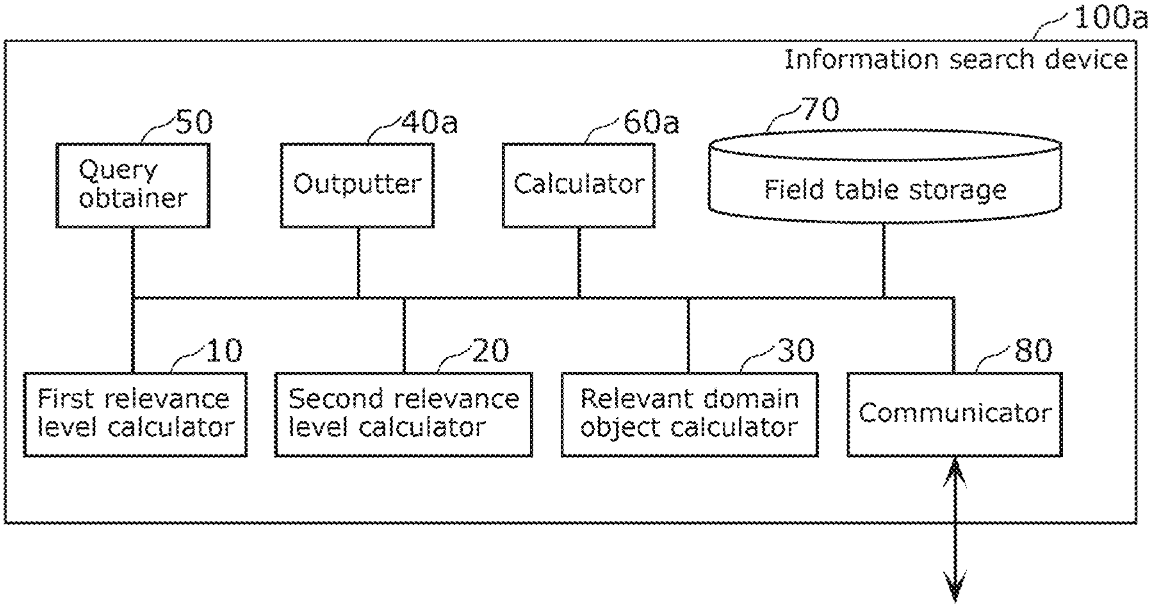
FIG. 14 is a block diagram illustrating the configuration of an information search device according to Embodiment 2.

FIG. 14 is a block diagram illustrating the configuration of information search device 100*a* according to Embodiment 2.

As illustrated in FIG. 14, information search device 100*a* is configured on the basis of information search device 100 according to Embodiment 1 by replacing calculator 60 with calculator 60*a* and replacing outputter 40 with outputter 40*a*.

Calculator 60*a* calculates, for each of the one or more malware-type domain objects included in the threat information stored in threat information collection server 200, a minimum value of a normalized Levenshtein distance between each of the one or more search queries and each name indicated in the one or more items of name information 614 included in one or more domain objects 610 linked to said malware-type domain object according to link information 621 included in one or more relationship objects 620 included in said threat information, and calculates an average distance that is the average of the minimum values calculated for these one or more names.

The normalized Levenshtein distance between character string A and character string B is a value obtained by dividing the Levenshtein distance between character string A and character string B by the number of characters in one of character string A and character string B that is made up of a smaller number of characters.

Outputter 40*a* outputs, to an external device, the second level of relevance calculated by second relevance level calculator 20 for at least one of the one or more malware-type domain objects included in the threat information stored in threat information collection server 200.

At this time, outputter 40*a* reorders the one or more malware-type domain objects in ascending order of the average distance calculated by calculator 60*a*, and outputs the second level of relevance on the basis of the result of reordering.

The description herein assumes that as a not necessarily limiting example, outputter 40*a*, which includes a display, generates an image representing the second level of relevance of at least one of the one or more malware-type domain objects included in the threat information stored in threat information collection server 200, and shows the generated image on the display, thus outputting said second level of relevance.

Figure 15:
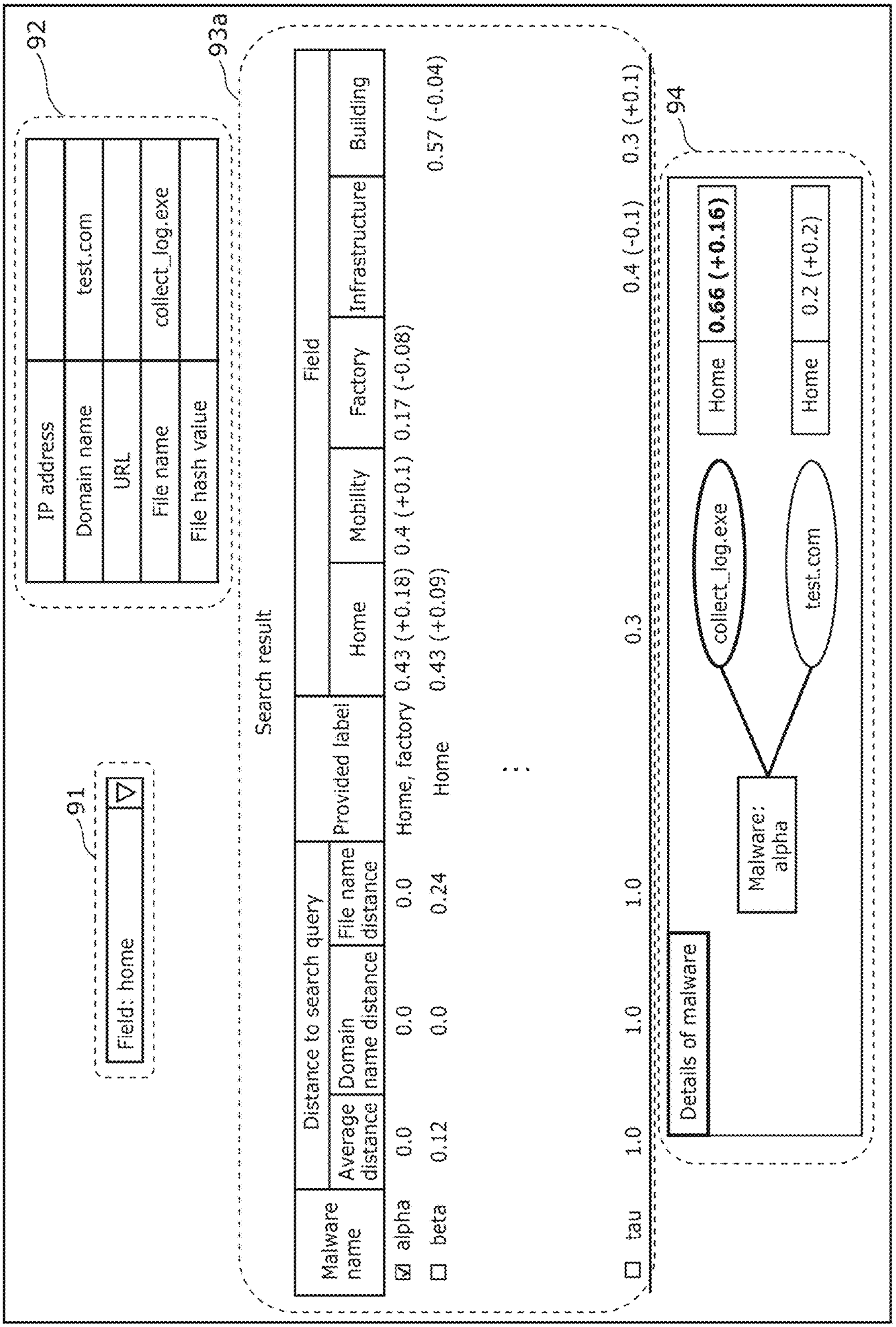
FIG. 15 is a schematic diagram illustrating one example of an image generated by an outputter according to Embodiment 2.

FIG. 15 is a schematic diagram illustrating one example of the image generated by outputter 40*a*.

As illustrated in FIG. 15, the image output by outputter 40*a* includes field selection bar 91, search query list 92, search result display region 93*a*, and details display region 94.

Search result display region 93*a* is a region in which the second levels of relevance between the one or more malware-type domain objects to be displayed and each of the plurality of fields are displayed in ascending order of the average distance from the top to the bottom.

The one or more malware-type domain objects to be displayed are malware-type domain objects each having the second level of relevance greater than 0 with respect to the field selected on field selection bar 91.

In each row in search result display region 93*a*, for one malware-type domain object, (1) the malware name indicated in name information 614 included in the malware-type domain object, (2) the average distance, (3) the distance of each type that matches the type of a search query (in this example, the domain name (test.com) and the file name (collect_log.exe)), (4) the field indicated in label information 615 included in the malware-type domain object, and (5) the second level of relevance to each of the plurality of fields and the amount of increase or decrease in the second level of relevance to said field are displayed in association with each other.

<Operation>

Information search device 100*a* configured as described above performs the second search process instead of the first search process performed by information search device 100 according to Embodiment 1.

Figure 16A:
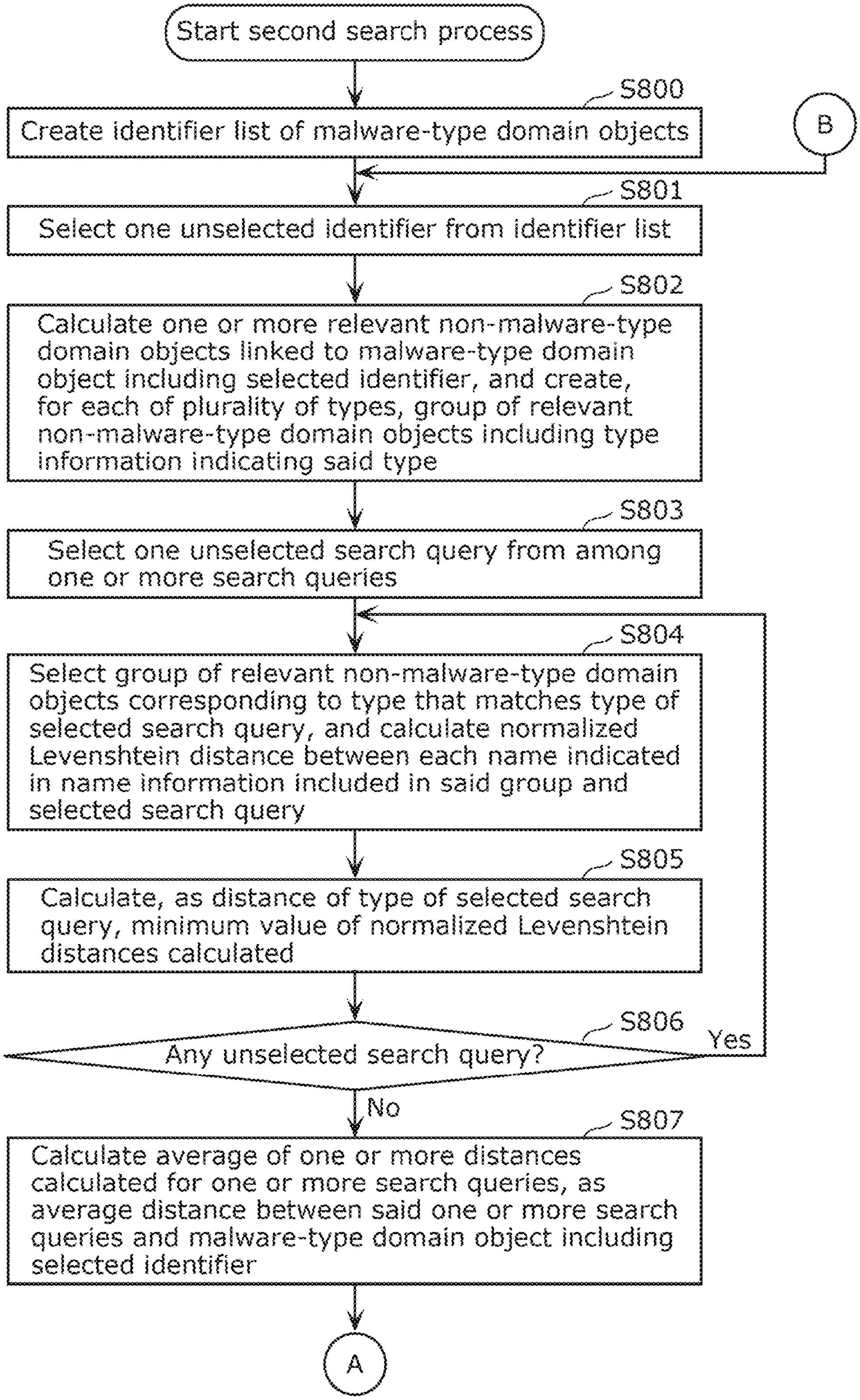
FIG. 16A is Flowchart 1 of a second search process performed by an information search device according to Embodiment 2.
Figure 16B:
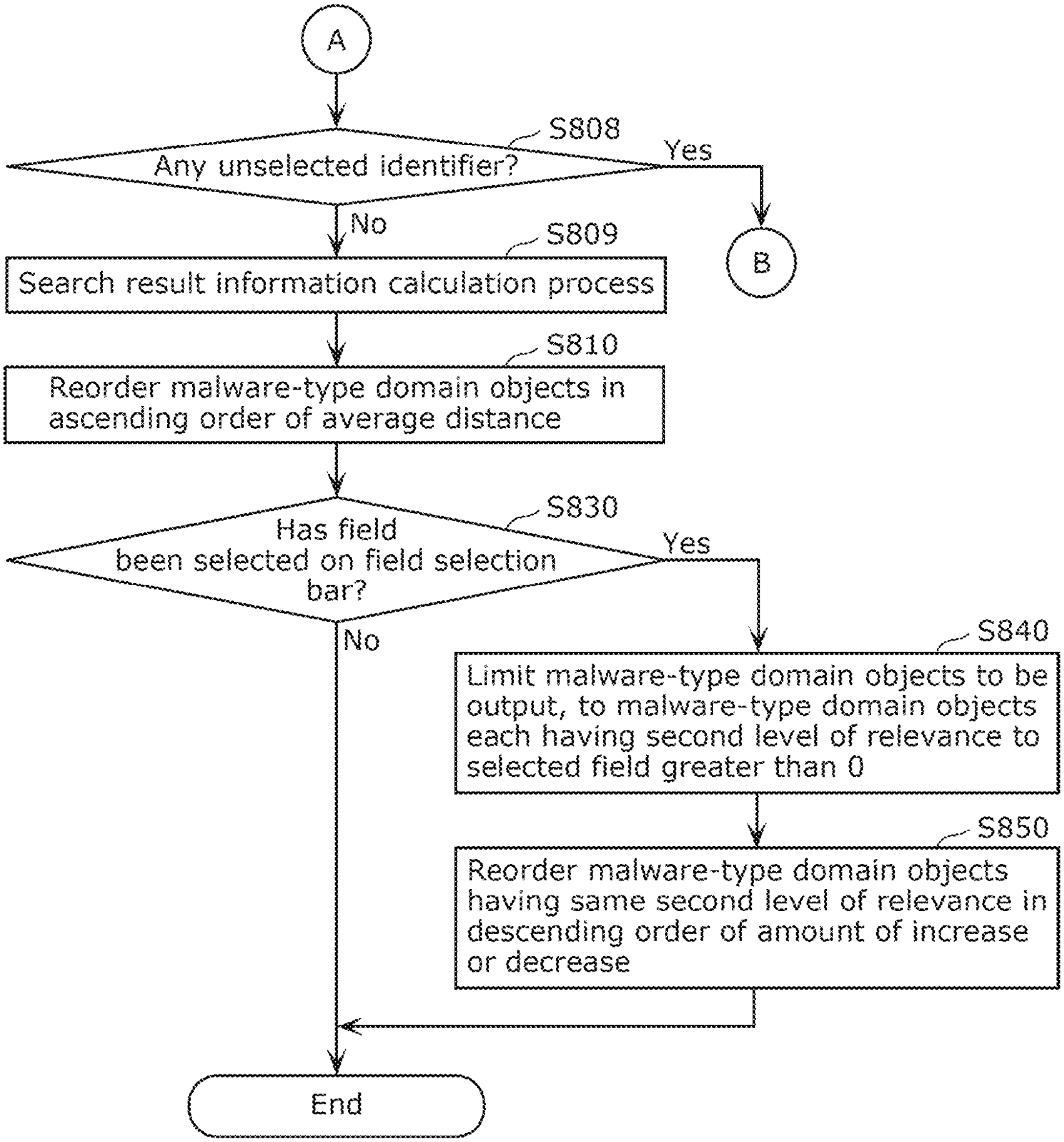
FIG. 16B is Flowchart 2 of a second search process performed by an information search device according to Embodiment 2.

FIG. 16A and FIG. 16B are flowcharts of the second search process performed by information search device 100*a*.

In the second search process illustrated in FIG. 16A and FIG. 16B, the process in Step S830 to the process in Step S850 are substantially the same as the process in Step S430 to the process in Step S450 in the first search process, except that outputter 40*a* is used instead of outputter 40.

Therefore, the process in Step S830 to the process in Step S850 will not be described as these processes have already been described, and the following description will focus on the process in Step S800 to the process in Step S810.

As indicated in FIG. 16A to FIG. 16B, when the second search process starts, relevant domain object calculator 30 creates an identifier list of the one or more malware-type domain objects included in the threat information stored in threat information collection server 200 (hereinafter also referred to as "the third identifier list") (Step S800).

When the third identifier list is created, calculator 60*a* selects one unselected identifier from the third identifier list (Step S801). This unselected identifier refers to an identifier that is included in the third identifier list and has not yet been selected in the process in Step S801 in the loop process formed of the process in Step S801 to the process of Yes in Step S808 (which will be described later).

When the unselected identifier is selected, calculator 60*a* calculates one or more relevant non-malware-type domain objects including type information indicating a type other than malware that are linked to the malware-type domain object identified by the selected identifier, and creates, for each of a plurality of types, a group of the relevant non-malware-type domain objects including the type information indicating said type (Step S802).

When this group is created for each of the plurality of types is created, calculator 60*a* selects one unselected search query from among the one or more search queries obtained by query obtainer 50 (Step S803). This unselected search query refers to a search query that is included in the one or more search queries obtained by query obtainer 50 and has not yet been selected in the process in Step S803 in the loop process formed of the process in Step S803 to the process of Yes in Step S806 (which will be described later).

When the unselected search query is selected, calculator 60*a* selects a group of relevant non-malware-type domain objects corresponding to a type that matches the type of the selected search query, and calculates a normalized Levenshtein distance between each name indicated in name information 614 included in the selected group and the selected search query (Step S804).

When the normalized Levenshtein distance between each name and the selected search query is calculated, calculator 60*a* calculates a minimum value of these normalized Levenshtein distances as the distance of the type of the selected search query (Step S805).

When the distance of the type of the selected search query is calculated, calculator 60*a* checks whether there is an unselected search query among the one or more search queries (Step S806).

When there is an unselected search query in the process in Step S806 (Yes in Step S806), calculator 60*a* performs the process in Step S804 again.

When there is no unselected search query in the process in Step S806 (No in Step S806), calculator 60*a* calculates the average of the one or more distances calculated for the one or more search queries, as an average distance between said one or more search queries and the malware-type domain object identified by the selected identifier (Step S807).

When the average distance between the one or more search queries and the malware-type domain object identified by the selected identifier is calculated, calculator 60*a* checks whether there is an unselected identifier in the third identifier list (Step S808).

When there is an unselected identifier in the process in Step S808 (Yes in Step S808), calculator 60*a* performs the process in Step S801 again.

When there is no unselected identifier in the process in Step S808 (No in Step S808), information search device 100*a* performs the search result information calculation process (Step S809).

When the search result calculation process ends, outputter 40*a* reorders the malware-type domain objects in ascending order of the average distance (Step S810).

When the process in Step S810 ends, the processing proceeds to the process in Step S830.

When no field has been selected on field selection bar 91 in the process in Step S830 (No in Step S830) and when the process in Step S850 ends, information search device 100*a* ends the second search process.

Additional Comments

As described above, Embodiment 1 and Embodiment 2 are presented as an exemplification of the technique disclosed in the present application. However, the present disclosure is not limited to these embodiments. Various modifications to the present embodiments that can be conceived by those skilled in the art, and forms configured by combining structural elements in different embodiments or variations, without departing from the teachings of the present disclosure may be included in the scope of one or more aspects of the present disclosure.

General and specific aspects of the present disclosure may be implemented using a system, a device, a method, an integrated circuit, a program, or a computer-readable, non-transitory recording medium such as a compact disc read-only memory (CD-ROM). Furthermore, these general and specific aspects of the present disclosure may be implemented using any combination of systems, devices, methods, integrated circuits, programs, and non-transitory recording media. For example, the present disclosure may be implemented as a program that causes a computer device to perform the processes that are performed by information search device 100.

INDUSTRIAL APPLICABILITY

The present disclosure can be widely used in systems, etc., that search for information regarding cyberattacks.

The invention claimed is:

1. An information search method for searching a database including a plurality of domain objects and a plurality of relationship objects for information regarding a cyberattack, wherein each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, the label information is information indicating at least one of a plurality of fields, and the information search method comprises:

calculating, for each of one or more non-malware-type domain objects including type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects;

calculating, for each of one or more malware-type domain objects including type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects;

calculating, for each of the one or more malware-type domain objects, a second level of relevance between the malware-type domain object and each of the plurality of fields, based on the first level of the relevance of each of the one or more relevant non-malware-type domain objects calculated in the calculating of the one or more relevant non-malware-type domain objects; and outputting, to an external device, the second level of the relevance of at least one of the one or more malware-type domain objects calculated in the calculating of the second level of the relevance.

2. The information search method according to claim 1, wherein the plurality of fields include at least two fields selected from among a home field indicating a field relevant to housing, a mobility field indicating a field relevant to a mobile body, a factory field indicating a field relevant to a factory, an infrastructure field indicating a field relevant to infrastructure, and a building field indicating a field relevant to a building.

3. The information search method according to claim 1, wherein each of the plurality of domain objects further includes name information indicating a name of the domain object and linked to the type information included in the domain object, the information search method further comprises:

obtaining one or more search queries; and calculating, for each of the one or more malware-type domain objects, a matching name count that is a total number of one or more names that match the one or more search queries among one or more names indicated in one or more items of the name information included in one or more domain objects linked to the malware-type domain object according to one or more items of the link information included in one or more relationship objects among the plurality of relationship objects, and in the outputting, the one or more malware-type domain objects are reordered in descending order of the matching name count, and the second level of the relevance is output based on a result of the reordering.

4. The information search method according to claim 1, wherein each of the plurality of domain objects further includes name information indicating a name of the domain object and linked to the type information included in the domain object, the information search method further comprises:

obtaining one or more search queries; and calculating, for each of the one or more malware-type domain objects, a minimum value of a normalized Levenshtein distance between each of the one or more search queries and each of one or more names indicated in one or more items of the name information included in one or more domain objects linked to the malware-type domain object according to one or more items of the link information included in one or more relationship objects among the plurality of relationship objects, and calculating an average distance that is an average of minimum values of the normalized Levenshtein distance calculated for the one or more names, and in the outputting, the one or more malware-type domain objects are reordered in ascending order of the average distance, and the second level of the relevance is output based on a result of the reordering.

5. The information search method according to claim 1, wherein in the calculating of the second level of the relevance, an average of first levels of the relevance calculated for the one or more relevant non-malware-type domain objects is calculated as the second level of the relevance.

6. An information search device that searches a database including a plurality of domain objects and a plurality of relationship objects for information regarding a cyberattack, wherein each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, the label information is information indicating at least one of a plurality of fields, and the information search device comprises:

a first relevance level calculator that calculates, for each of one or more non-malware-type domain objects including type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects;

a relevant domain object calculator that calculates, for each of one or more malware-type domain objects including type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects;

a second relevance level calculator that calculates, for each of the one or more malware-type domain objects, a second level of relevance between the malware-type domain object and each of the plurality of fields, based on the first level of the relevance of each of the one or more relevant non-malware-type domain objects calculated by the relevant domain object calculator; and an outputter that outputs, to an external device, the second level of the relevance of at least one of the one or more malware-type domain objects calculated by the second relevance level calculator.

7. A non-transitory computer-readable recording medium having recorded thereon a program for causing a computer to execute a process of searching a database including a plurality of domain objects and a plurality of relationship objects for information regarding a cyberattack, wherein each of the plurality of domain objects includes type information indicating a type of the domain object, each of one or more domain objects among the plurality of domain objects further includes label information indicating a field to which the domain object is relevant, the label information being linked to the type information, each of the plurality of relationship objects includes link information that links one domain object and another domain object among the plurality of domain objects, the type information is information indicating one of a plurality of types including a type representing malware, the label information is information indicating at least one of a plurality of fields, and the process includes:

calculating, for each of one or more non-malware-type domain objects including type information indicating a type other than the malware among the plurality of domain objects, a first level of relevance between the non-malware-type domain object and each of the plurality of fields, based on one or more fields indicated in one or more items of the label information included in one or more domain objects linked to the non-malware-type domain object, according to one or more items of the link information included in one or more relationship objects among the plurality of relationship objects;

calculating, for each of one or more malware-type domain objects including type information indicating the malware among the plurality of domain objects, one or more relevant non-malware-type domain objects each including the type information indicating a type other than the malware and each being linked to the malware-type domain object according to one or more items of the link information included in one or more relationship objects among the plurality of relationship objects;

calculating, for each of the one or more malware-type domain objects, a second level of relevance between the malware-type domain object and each of the plurality of fields, based on the first level of the relevance of each of the one or more relevant non-malware-type domain objects calculated in the calculating of the one or more relevant non-malware-type domain objects; and outputting, to an external device, the second level of the relevance of at least one of the one or more malware-type domain objects calculated in the calculating of the second level of the relevance.

* * * * *